(12) United States Patent

Anderson et al.

(10) Patent No.: US 12,669,078 B1

(45) Date of Patent: Jun. 30, 2026

(54) THERMALLY RESISTANT COMPOSITE EXHAUST COUPLER

(71) Applicant: Brunswick Corporation, Mettawa, IL (US)

(72) Inventors: Kevin R. Anderson, Fond du Lac, WI (US); Andrew J. Bingen, Iron Ridge, WI (US); Daniel D. Treptow, Cedarburg, WI (US); Kenneth G. Lemberger, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 343 days.

(21) Appl. No.: 16/697,656

(22) Filed: Nov. 27, 2019

(51) Int. Cl.
F01N 13/18 (2010.01)
B32B 1/08 (2006.01)
(Continued)

(52) U.S. Cl.
CPC ............ F01N 13/1816 (2013.01); B32B 1/08 (2013.01); B32B 5/024 (2013.01); B32B 25/10 (2013.01); F01N 13/16 (2013.01); B32B 2307/306 (2013.01); F01N 2530/22 (2013.01); Y10T 428/13 (2015.01); Y10T 428/131 (2015.01);
(Continued)

(58) Field of Classification Search
CPC ........... B32B 1/08; B32B 5/024; B32B 25/10; B32B 2307/306; F01N 13/16; F01N 13/1816; F01N 2530/22; Y10T 428/13; Y10T 428/131; Y10T 428/1314; Y10T 428/1317; Y10T 428/1321; Y10T 428/1352; Y10T 428/1372; Y10T 428/1386; Y10T 428/139; Y10T 428/1393
See application file for complete search history.

(56) References Cited

U.S. PATENT DOCUMENTS

| | | | |
|---|---|---|---|
| 1,862,723 A | 6/1932 | Summers |
| 2,305,295 A | 12/1942 | Lang et al. |
| (Continued) | | | |

FOREIGN PATENT DOCUMENTS

| | | |
|---|---|---|
| CA | 1285883 | 7/1991 |
| DE | 664031 | 10/1938 |
| (Continued) | | |

OTHER PUBLICATIONS

Mercury Marine Service Manual: Models 175XR2 Sport Jet. Mercury Marine; Nov. 1997.
(Continued)

*Primary Examiner* — Thomas J Kessler

(74) *Attorney, Agent, or Firm* — Andrus Intellectual Property Law, LLP

(57) ABSTRACT

A thermally resistant exhaust coupler having a thickness, an inner cylindrical surface and an outer cylindrical surface constructed of an elastomeric polymer and extend the length of the coupler as elastomeric polymer layers. The thickness includes at least one thermally resistant fiber layer located between the inner cylindrical surface and outer cylindrical surface and substantially extending the length of the thermally resistant exhaust coupler. The thermally resistant fiber layer may be constructed from a ceramic selected from one or more of the following materials: basalt, alumina, borica, silica, mullite, S glass or E glass, 3M® Nextel®, or a combination thereof.

25 Claims, 6 Drawing Sheets

(51) Int. Cl.
    *B32B 5/02*          (2006.01)
    *B32B 25/10*        (2006.01)
    *F01N 13/16*        (2010.01)

(52) U.S. Cl.
    CPC .... *Y10T 428/1314* (2015.01); *Y10T 428/1317*
        (2015.01); *Y10T 428/1321* (2015.01); *Y10T*
           *428/1352* (2015.01); *Y10T 428/1372*
        (2015.01); *Y10T 428/1386* (2015.01); *Y10T*
        *428/139* (2015.01); *Y10T 428/1393* (2015.01)

(56)                References Cited

U.S. PATENT DOCUMENTS

| | | | |
|---|---|---|---|
| 2,318,006 A | 5/1943 | Mercier | |
| 2,388,924 A | 11/1945 | Mercier | |
| 3,768,248 A | 10/1973 | Grgurich et al. | |
| 3,898,802 A | 8/1975 | Takokoro et al. | |
| 3,994,129 A | 11/1976 | Sakurai et al. | |
| 4,082,068 A | 4/1978 | Hale | |
| 4,188,784 A | 2/1980 | Hall | |
| 4,342,462 A | 8/1982 | Carlesimo | |
| 4,346,676 A | 8/1982 | Tyner | |
| 4,709,948 A | 12/1987 | Archer et al. | |
| 4,732,412 A | 3/1988 | van der Linden et al. | |
| 4,932,367 A | 6/1990 | Newman et al. | |
| 4,965,997 A | 10/1990 | Suzuki et al. | |
| 5,003,934 A | 4/1991 | Gubon et al. | |
| 5,012,648 A | 5/1991 | Okumura | |
| 5,337,706 A | 8/1994 | De Blasis | |
| 5,346,417 A | 9/1994 | Isogawa | |
| 5,374,209 A | 12/1994 | Wagner | |
| 5,378,180 A | 1/1995 | Nakayama et al. | |
| 5,463,990 A | 11/1995 | Rush, II et al. | |
| 5,476,402 A | 12/1995 | Nakai et al. | |
| 5,494,467 A | 2/1996 | Sohgawa et al. | |
| 5,513,606 A | 5/1996 | Shibata | |
| 5,553,586 A | 9/1996 | Koishikawa et al. | |
| 5,556,311 A | 9/1996 | Fujimoto | |
| 5,673,655 A | 10/1997 | Mishima | |
| 5,762,051 A | 6/1998 | Okamoto | |
| 5,778,833 A | 7/1998 | Kuranishi | |
| 5,778,847 A | 7/1998 | Takahashi et al. | |
| 5,820,426 A | 10/1998 | Hale | |
| 5,822,985 A | 10/1998 | Yoshimura | |
| 5,822,986 A | 10/1998 | Higashide | |
| 5,855,495 A | 1/1999 | Kubo | |
| 5,881,553 A | 3/1999 | Steenackers et al. | |
| 5,887,907 A | 3/1999 | Kubota et al. | |
| 5,893,783 A | 4/1999 | Hiraoka et al. | |
| 5,911,605 A | 6/1999 | Wooldridge et al. | |
| 5,911,608 A | 6/1999 | Nakayama et al. | |
| 6,053,786 A | 4/2000 | Mishima et al. | |
| 6,213,074 B1 | 4/2001 | Freese | |
| 6,220,605 B1 | 4/2001 | Becker, Jr. | |
| 6,298,815 B1 | 10/2001 | Kashima et al. | |
| 6,302,754 B1 | 10/2001 | Kashima | |
| 6,338,660 B1 | 1/2002 | Fukuda | |
| 6,461,208 B2 | 10/2002 | Suzuki et al. | |
| 6,543,429 B2 | 4/2003 | Osakabe et al. | |
| 6,622,481 B1 | 9/2003 | Ruman et al. | |
| 6,662,555 B1 | 12/2003 | Ishii | |
| 6,688,929 B2 * | 2/2004 | Lecours ................. F01N 1/089 | |
| | | 440/89 R | |
| 6,722,126 B2 | 4/2004 | Kawamizu | |
| 7,001,231 B1 | 2/2006 | Halley et al. | |
| 7,043,915 B2 | 5/2006 | Anello | |
| 7,115,009 B2 | 10/2006 | Itoh et al. | |
| 7,162,985 B2 | 1/2007 | Itoh et al. | |
| 7,214,110 B1 | 5/2007 | Ehlers et al. | |
| 7,361,067 B1 | 4/2008 | Smedema | |
| 7,377,251 B2 | 5/2008 | Wizgall et al. | |
| 7,451,734 B2 | 11/2008 | Weber | |
| 7,704,111 B2 | 4/2010 | Ito et al. | |
| 7,731,241 B2 | 6/2010 | Aoki et al. | |
| 7,837,233 B2 | 11/2010 | Johnston et al. | |

| | | | |
|---|---|---|---|
| 7,867,048 B2 | 1/2011 | Ochiai | |
| 7,895,992 B2 | 3/2011 | Diggs et al. | |
| 7,930,883 B2 | 4/2011 | Konakawa et al. | |
| 7,954,314 B1 | 6/2011 | Bruestle et al. | |
| 8,002,597 B2 | 8/2011 | Ochiai | |
| 8,266,906 B2 | 9/2012 | Wu et al. | |
| 8,366,501 B2 | 2/2013 | Kazuta | |
| 8,500,501 B1 | 8/2013 | Taylor et al. | |
| 8,540,536 B1 | 9/2013 | Eichinger et al. | |
| 8,668,538 B1 | 3/2014 | Langenfeld et al. | |
| 8,801,482 B2 | 8/2014 | Ochiai et al. | |
| 8,858,283 B2 | 10/2014 | Ochiai et al. | |
| 8,978,372 B2 | 3/2015 | Ochiai et al. | |
| 9,120,549 B2 | 9/2015 | Ochiai et al. | |
| 9,174,818 B1 | 11/2015 | Langenfeld et al. | |
| 9,365,275 B1 | 6/2016 | Habeck et al. | |
| 9,616,987 B1 | 4/2017 | Langefeld et al. | |
| 9,752,711 B2 | 9/2017 | Knapp | |
| 2002/0017252 A1 | 2/2002 | Onoue | |
| 2002/0079161 A1 * | 6/2002 | Curtice ................... F01N 1/24 | |
| | | 181/252 | |
| 2003/0051683 A1 | 3/2003 | Okamoto | |
| 2004/0142612 A1 | 7/2004 | Tawa et al. | |
| 2004/0203299 A1 | 10/2004 | Kashima et al. | |
| 2005/0263123 A1 | 12/2005 | Itoh et al. | |
| 2006/0144369 A1 | 7/2006 | Takahashi et al. | |
| 2007/0056281 A1 | 3/2007 | Arvan et al. | |
| 2009/0007550 A1 | 1/2009 | Konakawa et al. | |
| 2009/0078240 A1 | 3/2009 | Diggs et al. | |
| 2009/0094965 A1 | 4/2009 | Takewaki | |
| 2009/0215333 A1 | 8/2009 | Ochiai | |
| 2010/0130079 A1 | 5/2010 | White et al. | |
| 2010/0240269 A1 | 9/2010 | Ochiai | |
| 2010/0242450 A1 | 9/2010 | Werni et al. | |
| 2011/0223819 A1 | 9/2011 | Kazuta | |
| 2013/0022489 A1 * | 1/2013 | Kawabata ............... C22C 38/04 | |
| | | 420/70 | |
| 2013/0130577 A1 | 5/2013 | Ochiai et al. | |
| 2013/0210295 A1 | 8/2013 | Davis et al. | |
| 2014/0284914 A1 | 9/2014 | Tsambarlis | |
| 2016/0114878 A1 | 4/2016 | Hubbard, Jr. | |
| 2016/0257794 A1 * | 9/2016 | Grimm ................... C08J 5/043 | |
| 2017/0307109 A1 | 10/2017 | McCarter | |
| 2019/0154173 A1 * | 5/2019 | Sha ....................... B32B 19/045 | |

FOREIGN PATENT DOCUMENTS

| | | | |
|---|---|---|---|
| DE | 2344864 | 4/1975 | |
| DE | 2449753 | 4/1976 | |
| DE | 3150001 | 6/1983 | |
| DE | 3631312 | 7/1987 | |
| DE | 4030652 | 4/1992 | |
| DE | 4042415 | 11/1992 | |
| DE | 4136799 | 5/1993 | |
| DE | 19736500 | 12/1998 | |
| DE | 69823516 | 4/2005 | |
| DE | 202005019046 | 3/2006 | |
| DE | 102004060845 | 6/2006 | |
| DE | 102006043864 | 6/2007 | |
| DE | 202008010025 | 11/2008 | |
| DE | 102010034953 | 6/2011 | |
| DE | 102011001195 | 9/2011 | |
| DE | 102010015679 | 10/2011 | |
| EP | 0697914 B1 * | 8/1999 | |
| EP | 0685637 | 12/1999 | |
| EP | 1069301 | 1/2001 | |
| FR | 651848 | 2/1929 | |
| GB | 436058 | 10/1935 | |
| GB | 518518 | 2/1940 | |
| GB | 674532 | 6/1952 | |
| GB | 915230 | 1/1963 | |
| JP | 5699005 | 12/1954 | |
| JP | 55010043 | 1/1980 | |
| JP | 06146876 | 5/1994 | |
| JP | 1994264757 | 9/1994 | |
| JP | 1997317464 | 12/1997 | |
| JP | 2000356123 | 12/2000 | |
| JP | 2001140636 | 5/2001 | |
| JP | 200297948 | 4/2002 | |

(56)          References Cited

FOREIGN PATENT DOCUMENTS

| | | |
|---|---|---|
| JP | 2002097948 | 4/2002 |
| JP | 2003286842 | 10/2003 |
| JP | 200460557 | 2/2004 |
| JP | 2004293404 | 10/2004 |
| JP | 2005188351 | 7/2005 |
| JP | 2005188352 | 7/2005 |
| JP | 2006170020 | 6/2006 |
| JP | 2008031868 | 2/2008 |
| JP | 2008031897 | 2/2008 |
| JP | 2008031898 | 2/2008 |
| JP | 2009002265 | 1/2009 |
| JP | 4329396 | 9/2009 |
| JP | 2010242744 | 10/2010 |
| JP | 2011190704 | 9/2011 |
| JP | 2011202578 | 10/2011 |
| WO | 1989004421 | 5/1989 |

OTHER PUBLICATIONS

Norma Pacific, Benefits of NORMACONNECT® Pipe Couplings, http://www.normaamericadsds.com/sites/default/files/product_pdfs/Normaconnect%20RepRep%20E.pdf, date of visit Feb. 1, 2018.

Grainger Approved AWWA Coupling, 5 in L—5ENH5146103460421000—Granger, https://www.grainger.com/product/5ENH5?cm_mmc=PPC:+Google+PLA&s_kwcid=AL!2966!3!166588805278!!!s!82128168837!&ef_id=U9gKpwAAAB, date of visit Feb. 1, 2018.

Grip-m Nbr Flexible and Multifunctional Pipe Joining Coupling with Steep Strip Insert Option, https://www.alibaba.com/product-detail/GRIP-M-NVR-Flexible-and-Multinational_60508104098.html, date of visit Feb. 1, 2018.

Google Image Result for https://i.ytimg.com/vi/m660Dv0M_qc/maxresdefault.jpg, dated of visit Feb. 1, 2018.

* cited by examiner

THERMALLY RESISTANT COMPOSITE EXHAUST COUPLER

FIELD

The present disclosure relates to exhaust systems for marine propulsion devices, and particularly to exhaust couplers for marine propulsion devices configured to withstand high temperatures.

BACKGROUND

Flexible exhaust couplers for flexibly coupling an engine exhaust conduit to an engine exhaust manifold and bridging and gaps between those components are known in the art. FIGS. 1-4 demonstrate one solution currently known in the art where a metallic coil is used to bridge the gap between the components and protect the flexible coupler constructed of silicone rubber. This solution is further described in U.S. Pat. No. 10,329,978, incorporated herein by reference.

SUMMARY

The present application provides a thermally resistant exhaust coupler having an inner cylindrical surface and an outer cylindrical surface having a first distance between the two surfaces. The first distance defines the thickness of the coupler. The thermally resistant exhaust coupler has a top surface and a bottom surface and defining a second distance between the top and bottom surfaces establishing a length of the coupler. The inner cylindrical surface and outer cylindrical surface are constructed of an elastomeric polymer and extend the length of the coupler as elastomeric polymer layers. The thickness includes at least one thermally resistant fiber layer located between the inner cylindrical surface and outer cylindrical surface and substantially extending the length of the thermally resistant exhaust coupler.

The elastomeric polymer may be one or more of the following materials: silicone rubber, nitrile butadiene rubber, high nitrile butadiene rubber, styrene butadiene rubber, ethylene propylene diene monomer rubber, epichlorohydrin and fluorinated hydrocarbon, or a combination thereof. The thermally resistant fiber layer may be constructed from a ceramic fiber. The ceramic fiber may be selected from one or more of the following materials: basalt, alumina, borica, silica, mullite, S glass or E glass, 3M® Nextel®, or a combination thereof. Alternatively, a Kevlar® fiber (poly-paraphenylene terephthalamide) layer may be used. The thermally resistant fiber layer may be an open weave fiber layer or a closed weave fiber layer. In one embodiment, the elastomeric polymer is silicone rubber and the thermally resistant fiber layer is a closed weave basalt ceramic fiber.

The elastomeric polymer has a decomposition temperature such that the elastomeric polymer retains greater than 50% of its mass when heated above its decomposition temperature in an exhaust environment to create a decomposed polymer. The decomposed polymer is retained within the thermally resistant fiber layer after decomposition. The thermally resistant fiber layer has lower thermal conductivity than the elastomeric polymer when measured perpendicular to the exhaust flow direction such that the temperature of the outer cylindrical surface is at least 140° C. less than the inner cylindrical surface. When a closed weave fiber is used, the temperature of the outer cylindrical surface is at least 200° C. less than the inner cylindrical surface.

In certain embodiments, the thickness of the thermally resistant exhaust coupler includes at least two thermally resistant fiber layers located between the inner cylindrical surface and outer cylindrical surface and extending substantially the length of the thermally resistant exhaust coupler. In this embodiment, the thickness further includes an elastomeric polymer layer extending between the at least two thermally resistant fiber layers and extending substantially along the length of the thermally resistant exhaust coupler.

In other embodiments, the thickness of the thermally resistant exhaust coupler includes three thermally resistant fiber layers located between the inner cylindrical surface and outer cylindrical surface and extending substantially the length of the thermally resistant exhaust coupler and defining a first thermally resistant fiber layer, a second thermally resistant fiber layer, and a third thermally resistant fiber layer. In this embodiment, the thickness further includes a first intermediate elastomeric polymer layer extending between the first thermally resistant fiber layer and the second thermally resistant fiber layer and extending substantially along the length of the thermally resistant exhaust coupler, and a second intermediate elastomeric polymer layer extending between the second thermally resistant fiber layer and the third thermally resistant fiber layer and extending substantially along the length of the thermally resistant exhaust coupler.

In another embodiment, the thickness of the thermally resistant exhaust coupler includes four thermally resistant fiber layers located between the inner cylindrical surface and outer cylindrical surface and extending substantially the length of the thermally resistant exhaust coupler, and defining a first thermally resistant fiber layer, a second thermally resistant fiber layer, a third thermally resistant fiber layer, and a fourth thermally resistant fiber layer. In this embodiment, the thickness further includes a first intermediate elastomeric polymer layer extending between the first thermally resistant fiber layer and the second thermally resistant fiber layer and extending substantially along the length of the thermally resistant exhaust coupler; a second intermediate elastomeric polymer layer extending between the second thermally resistant fiber layer and the third thermally resistant fiber layer and extending substantially along the length of the thermally resistant exhaust coupler; and a third intermediate elastomeric polymer layer extending between the third thermally resistant fiber layer and the fourth thermally resistant fiber layer and extending substantially along the length of the thermally resistant exhaust coupler. The inner cylindrical surface, the outer cylindrical surface, the first intermediate elastomeric polymer layer, the second intermediate elastomeric polymer layer, and the third intermediate elastomeric polymer layer may comprise one or more of the following elastomeric polymers: silicone rubber, nitrile butadiene rubber, high nitrile butadiene rubber, styrene butadiene rubber, ethylene propylene diene monomer rubber, epichlorohydrin and fluorinated hydrocarbon, or a combination thereof. The first thermally resistant fiber layer, the second thermally resistant fiber layer, the third thermally resistant fiber layer, and the fourth thermally resistant fiber layer are constructed from one or more of the following materials: basalt, alumina, borica, silica, mullite, S glass or E glass, 3M® Nextel®, or a combination thereof. Alternatively, a Kevlar® fiber layer may be used. In one embodiment, the first thermally resistant fiber layer, the second thermally resistant fiber layer, the third thermally resistant fiber layer, and the fourth thermally resistant fiber layer are closed weave fiber layers. In another embodiment, the inner cylindrical surface, the outer cylindrical surface, the first intermediate elastomeric polymer layer, the second intermediate elastomeric polymer layer, and the third intermediate elastomeric polymer layer are silicone rubber and the first thermally resistant fiber layer, the second thermally resistant fiber layer, the third thermally resistant fiber layer, and the fourth thermally resistant fiber layer are constructed from a closed weave basalt ceramic fiber.

DETAILED DESCRIPTION

Figures 1, 2:
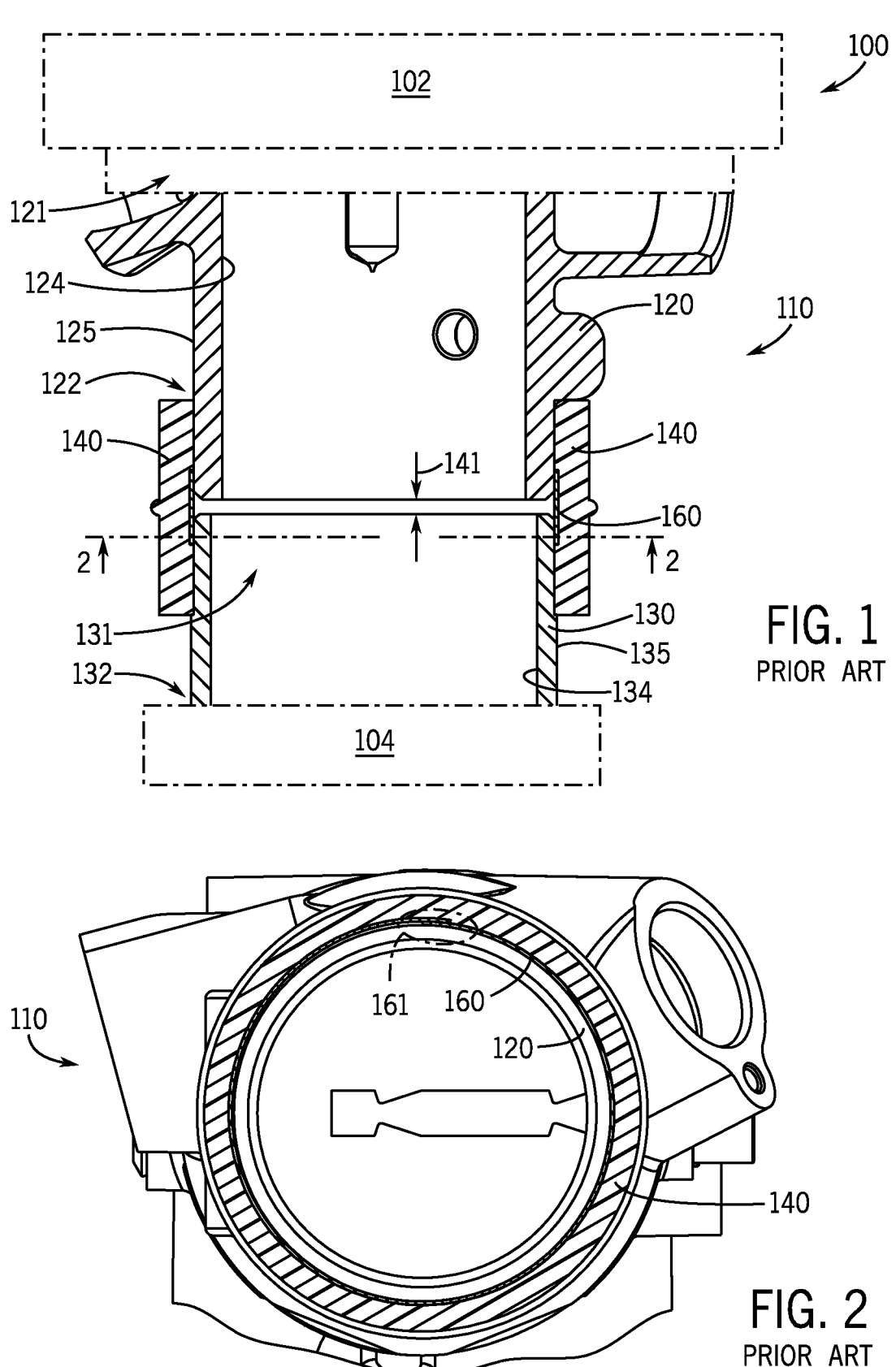
FIG. 1 is a partial side sectional view of an exhaust system, with a prior art coupling connecting an exhaust manifold and an exhaust conduit.
FIG. 2 is a view of Section 2-2, taken in FIG. 1.

In the present disclosure, certain terms have been used for brevity, clearness and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

FIGS. 1 through 4 depict a prior art exhaust system where a flexible couple 140 and metallic coil 160 are used to seal a gap 141 between an exhaust manifold 120 and an exhaust conduit 130. In particular, the figures disclose an exhaust system for a marine propulsion device 100 having an internal combustion engine 102 and a driveshaft housing 104. The exhaust system 110 conveys exhaust gas away from the internal combustion engine 102, which flows from an upstream end 121 to a downstream end 122 within an exhaust manifold 120. The downstream end 122 of the exhaust manifold 120 has an outer surface 125 and an inner surface 124. The exhaust system 110 further includes an exhaust conduit 130 that conveys the exhaust gas between the exhaust manifold 120 and the driveshaft housing 104. The exhaust conduit 130 has an upstream end 131 and a downstream end 132 and is comprised of an outer surface 135 and an inner surface 134. In the embodiment shown, the downstream end 132 is closer to the driveshaft housing 104 than to the exhaust manifold 120. Likewise, the upstream end 131 of the exhaust conduit 130 is proximal to the downstream end 122 of the exhaust manifold 120.

Since the exhaust manifold 120 is fixed relative to the internal combustion engine 102, and the exhaust conduit 130 is fixed relative to the driveshaft housing 104, it is desirable to avoid a rigid connection between the exhaust manifold 120 and the exhaust conduit 130. More specifically, the effects of component tolerances, and also the retraction and expansion of components during different operational states, generates issues when the exhaust manifold 120 is rigidly coupled to the exhaust conduit 130. In particular, these effects can cause damage to the exhaust system 110 when the exhaust manifold 120 and exhaust conduit 130 are rigidly coupled. The same effects of production tolerances (i.e. part variation), as well as engine operation and different heating states caused through operation, provide that the exhaust manifold 120 and the exhaust conduit 130 do not necessarily remain coaxial during all operational states. Accordingly, gap 141 exists between the downstream end 122 of the exhaust manifold 120 and the upstream end 131 of the exhaust conduit 130. In certain embodiments, the gap 141 is 3.0 mm or less.

Therefore, a mechanism for flexibly coupling the exhaust conduit 130 to the exhaust manifold 120 and bridging gap 141 is desired. The high temperatures of air and water within the exhaust system 110 precludes the use of traditional flexible couplers known in the art for operatively coupling the exhaust manifold 120 to the exhaust conduit 130. More-over, even where cooling sprayers are provided within the exhaust system 110, non-uniform flow turbulence and non-uniform temperatures remain present throughout the exhaust system 110. While this may be tolerable within the exhaust manifold 120 or the exhaust conduit 130 individually, any "hot spots" quickly deteriorate any traditional flexible couplers known in the art when provided between the exhaust manifold 120 and the exhaust conduit 130. A particularly troublesome hot spot is the gap 141 between the exhaust manifold 120 and the exhaust conduit 130.

Therefore, there is a need for a flexible coupler capable of conveying exhaust gas between the exhaust manifold 120 and the exhaust conduit 130—with gap 141 therebetween that necessarily exposes the flexible coupler—that can survive the non-uniform conditions. One solution, shown in FIGS. 1-4, is to use a flexible coupler 140 having an outer surface 145 and an inner surface 144 to couple the down-stream end 122 of the exhaust manifold 120 to the upstream end 131 of the exhaust conduit 130 such that exhaust gas flows therethrough. A metallic coil 160 is coaxially aligned (axis MA) with and protects the flexible coupler 140 (axis FA) while coupling the exhaust manifold 120 to the exhaust conduit 130. The flexible coupler 140 biases the metallic coil 160 into contact with both the outer surface 125 of the exhaust manifold 120, and the outer surface 135 of the exhaust conduit 130. The exhaust manifold 120, exhaust conduit 130, and metallic coil 160 are preferably made of aluminum. The metallic coils 160 may also be constructed of bronze or copper and may be hand anodized in certain embodiments to further protect against corrosion. In this manner, engagement of metallic coil 160 with both the exhaust manifold 120 and the exhaust conduit 130 provides conduction of heat therebetween.

Figure 4:
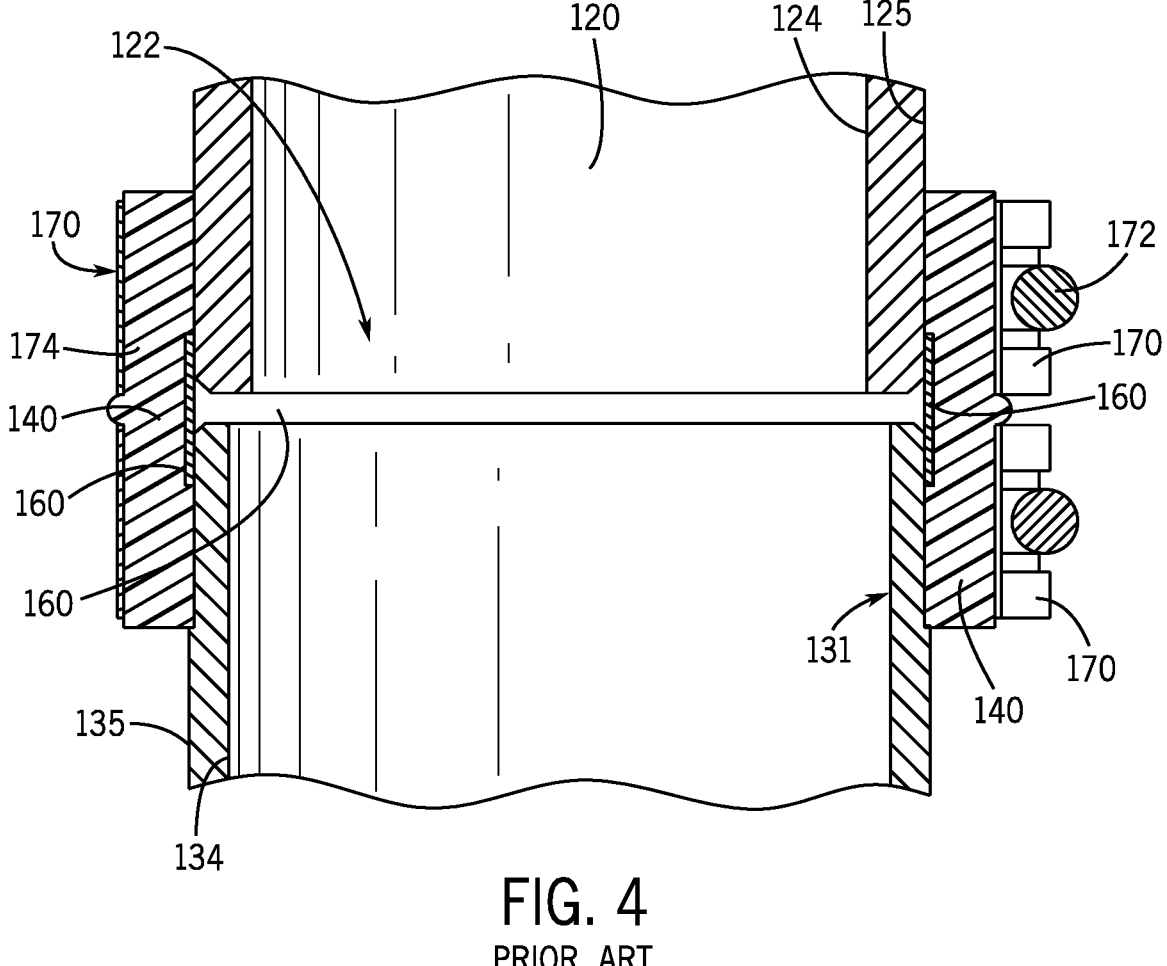
FIG. 4 depicts a prior art coupling that is similar to the embodiment shown in FIG. 1.
Figures 5, 6:
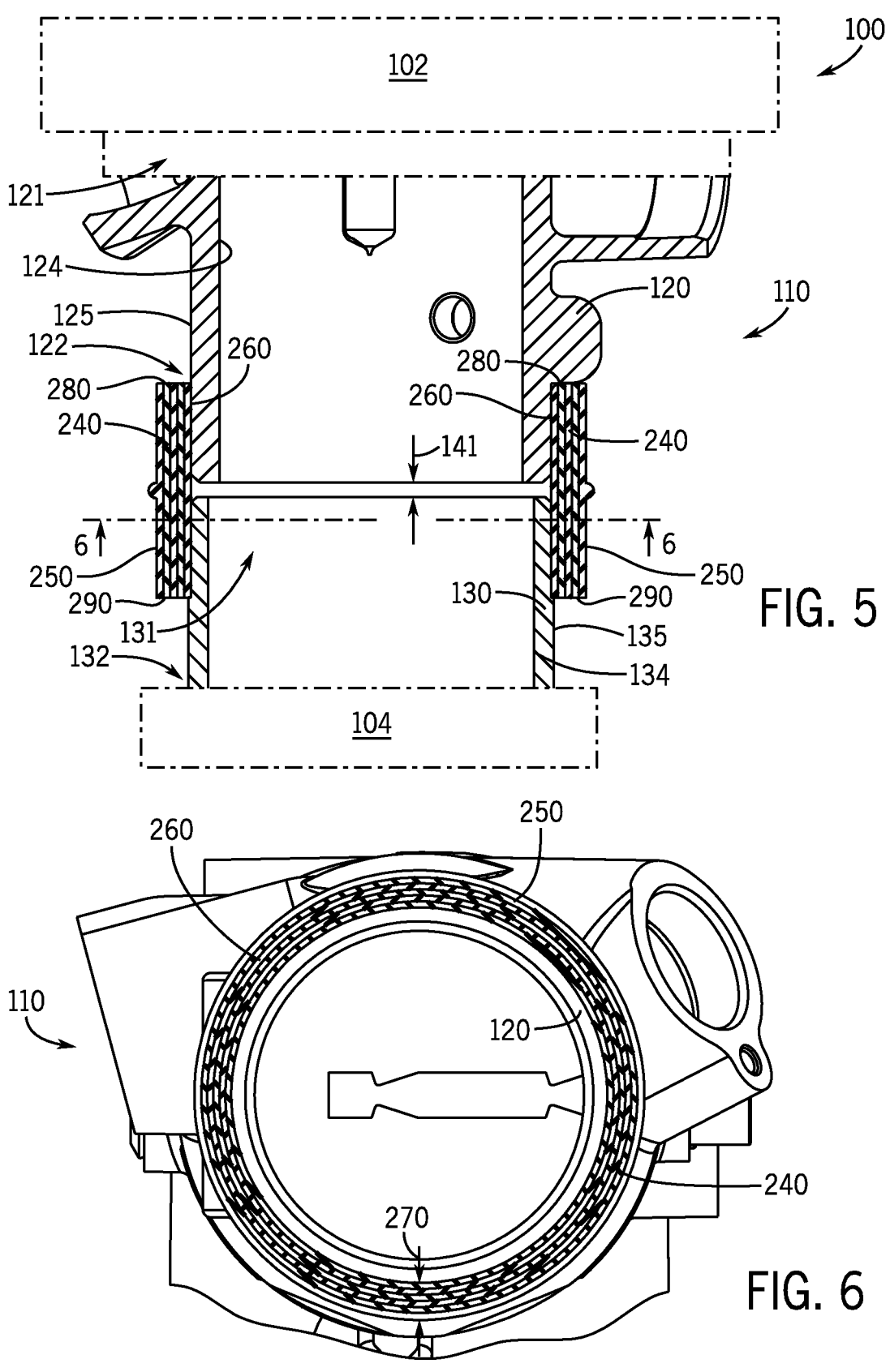
FIG. 5 is a partial side sectional view of an exhaust system similar to FIG. 1, but with a thermally resistant exhaust coupler according to the present application connecting an exhaust manifold and an exhaust conduit.
FIG. 6 is a view of Section 6-6, taken in FIG. 5.
Figure 7:
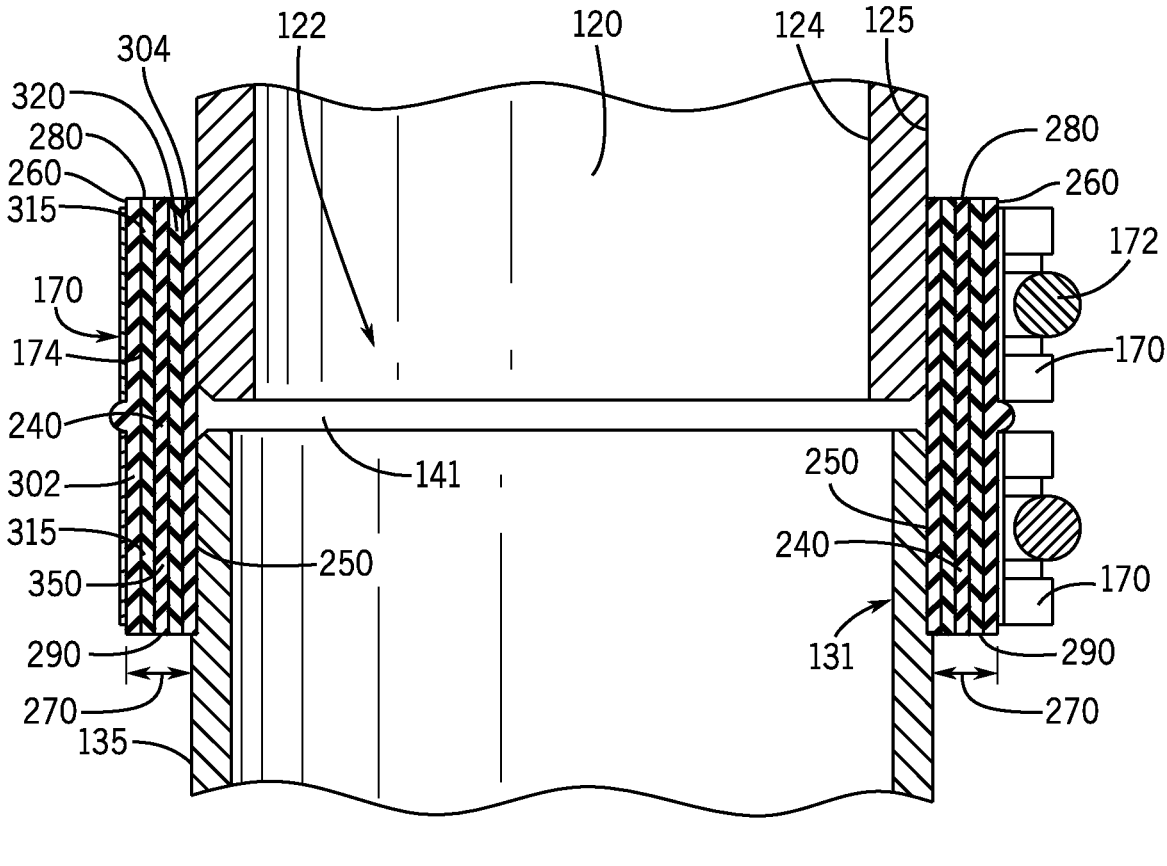
FIG. 7 depicts the thermally resistant exhaust coupler according to the present application in use with clamps to hold the thermally resistant coupler in position.

As shown in FIG. 4, a pair of clamps 170 engage the outer surfaces 145 of the flexible coupler 140. A first clamp 170 causes the inner surface 144 of the flexible coupler 140 to sealingly engage with the outer surface 125 of the exhaust manifold 120, and a second clamp 170 causes the inner surface 144 of the flexible coupler 140 to engage at an opposite end of the flexible coupler 140 with the outer surface 135 of the exhaust conduit 130. The pair of clamps are hose clamps and may have a track 174 and a screw 172 for tightening and loosening the clamp 170 in the manner known in the art. In other embodiments, constant tension T-bolt clamps in addition to, or instead of typical hose clamps may be used. In such cases, the spring tension maintains the loading of the clamp, as known in the art.

Figures 3A, 3B, 3C:
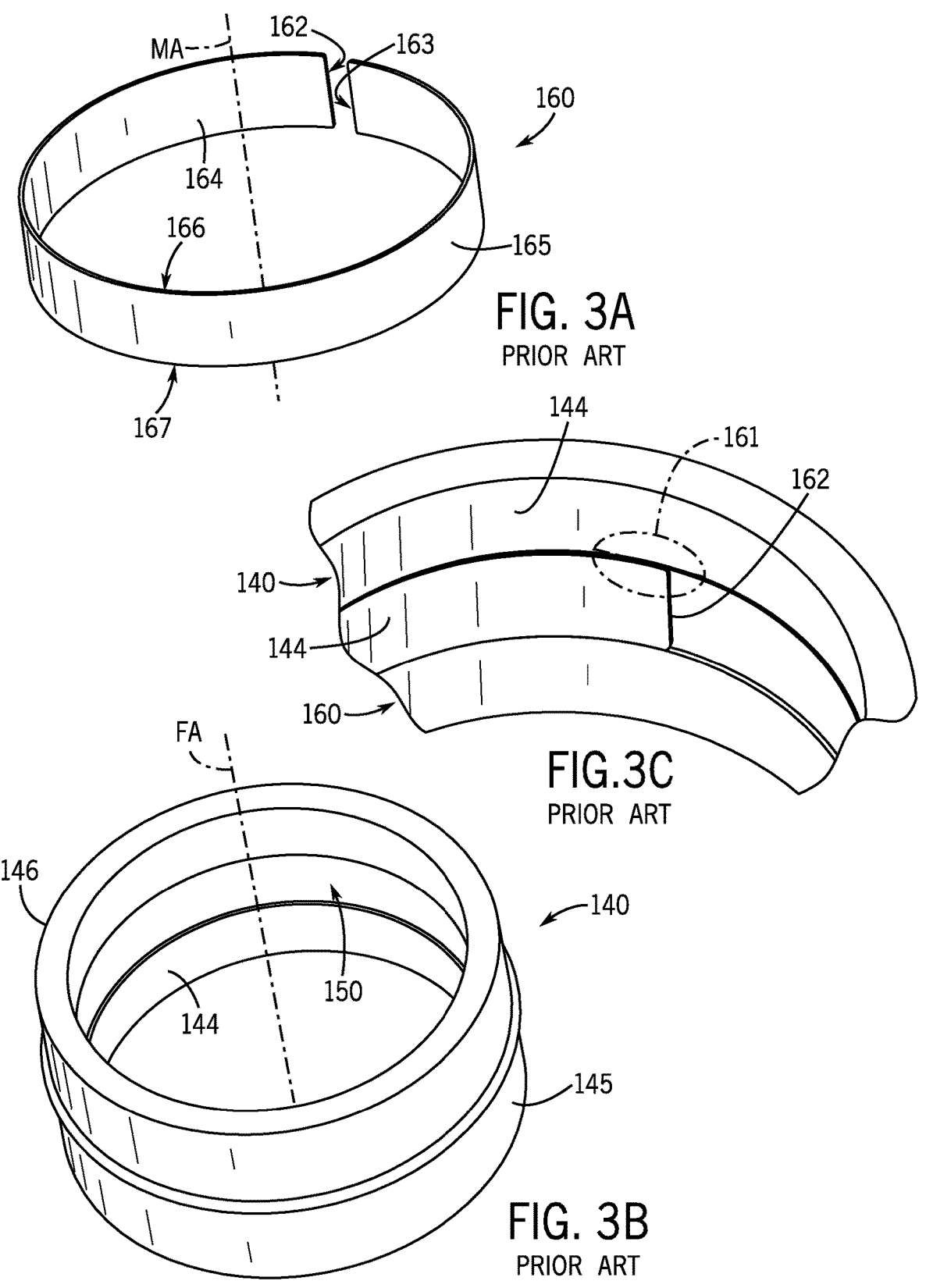
FIGS. 3A-C are perspective views of a metallic coil, a flexible coupler, and a coupled assembly according to the prior art.

As shown in FIGS. 3A-3C, the flexible coupler 140 defines a radial channel 150 within the inner surface 144 that is configured to retain the metallic coil 160. The radial channel 150 prevents axial movement of the metallic coil 160. The metallic coil 160 has an upstream end 166 opposite a downstream end 167, and an inner face 164 opposite an outer face 165. The metallic coil 160 has a first end 162 opposite a second 163, whereby the first end 162 slidably overlaps the second end 163 to form a ring of variable circumference (overlap 161). When the metallic coil is located in the flexible coupler 140 and the clamp 170 is tightened around the flexible coupler 140, the metallic coil 160 slides on top of itself to maintain uniform contact with the exhaust manifold 120 and the exhaust conduit 130 to encircle gap 141.

The prior art flexible coupler 140 is made of a seventy durometer silicone material. The inventors have discovered that certain problems may arise when the metallic coil 160 and prior art flexible coupler 140 are exposed to extended periods of hot exhaust, for example if the exhaust does not uniformly mix with water to cool the exhaust gasses. Namely, the silicone or other polymeric material is thermally damaged, causing the coupler 140 to creep under clamps 170 and preventing the scaling between the exhaust manifold 120 and the exhaust conduit 130 thereby potentially exposing exhaust gases to the atmosphere. In other instances, the heat causes the flexible coupler 140 to split, again eliminating the sealing qualities and exposing exhaust gases to the atmosphere. Another issue that may arise is that the metallic coil 160 becomes heated such that it cuts through the flexible coupler 140 because the metallic coil 160 retains heat and degrades the silicone. This is problematic because the metallic coil 160 expands and often becomes misaligned as the coupler degrades, exposing flexible coupler 140 directly to exhaust gases and eliminating the sealing function. At other times the metallic coil 160 has eroded and fretted from the heat exposure such that the metallic coil is unsecured and again fails to shield the flexible coupler 140 from exhaust gases. Other problems may exist as well: the low torque on the prior art flexible coupler 140 is difficult to apply in the field; there is variation in alignment between the exhaust manifold 120 and the exhaust conduit 130 that is difficult to accommodate with the metallic ring 160, and there are numerous parts that are difficult to install and that reduce the cosmetic craftsmanship underneath the cowling.

Accordingly, the present inventors have experimented with removing the metallic coil 160 and replacing the flexible coupler 140 with a thermally resistant composite reinforced polymeric material exhaust coupler 240, as shown in FIGS. 5-9. The thermally resistant exhaust coupler 240 includes an inner cylindrical surface 250 and an outer cylindrical surface 260. The distance between the inner cylindrical surface 250 and the outer cylindrical surface 260 defines a thickness 270 of the thermally resistant exhaust coupler 240. The thermally resistant exhaust coupler 240 has a top surface 280 and a bottom surface 290. The distance between the top surface 280 and the bottom surface 290 defines a length 295 of the thermally resistant exhaust coupler 240.

The inner cylindrical surface 250 and outer cylindrical surface 260 are constructed of layers 302, 304 of an elastomeric polymer 300 extending the length 295 of the thermally resistant exhaust coupler 240. The thickness 270 of the thermally resistant exhaust coupler 240 may include at least one layer 315, 320, 330, 340 of thermally resistant fabric 310 located between an inner cylindrical surface layer 304 and an outer cylindrical surface layer 302. In certain embodiments, multiple intermediate alternating layers 350, 360, 370 of elastomeric polymer 300 and multiple alternating layers 315, 320, 330, 340 of thermally resistant fabric 310 are used. Each layer 315, 320, 330, 340 of thermally resistant fabric 310 may extend the length 295 of the thermally resistant exhaust coupler 240. In certain embodiments, such as the embodiment shown in FIGS. 5-7, the thickness 270 includes at least two thermally resistant fiber layers 315, 320 located between the inner cylindrical surface layer 304 and outer cylindrical surface layer 302, and thus between the inner cylindrical surface 250 and the outer cylindrical surface 260. Each thermally resistant fiber layer 315, 320 may extend the length 295 of the thermally resistant exhaust coupler 240. In this embodiment, the thickness 270 further includes an elastomeric polymer layer 350 extending between the two thermally resistant fiber layers 315, 320 substantially along the length 295 of the thermally resistant exhaust coupler 240. In other embodiments, the thickness 270 may include a first thermally resistant fiber layer 315, a second thermally resistant fiber layer 320, and a third thermally resistant fiber layer 330 extending substantially the length 295 of the thermally resistant exhaust coupler 240 and located between the inner cylindrical surface layer 304 and outer cylindrical surface layer 302, and thus between the inner cylindrical surface 250 and the outer cylindrical surface 260. In this embodiment, the thickness 270 further includes a first intermediate elastomeric polymer layer 350 extending between the first thermally resistant fiber layer 315 and the second thermally resistant fiber layer 320 along the length 295, and a second intermediate elastomeric polymer layer 360 extending between the second thermally resistant fiber 320 layer and the third thermally resistant fiber layer 330 along the length 295.

Figures 8, 9:
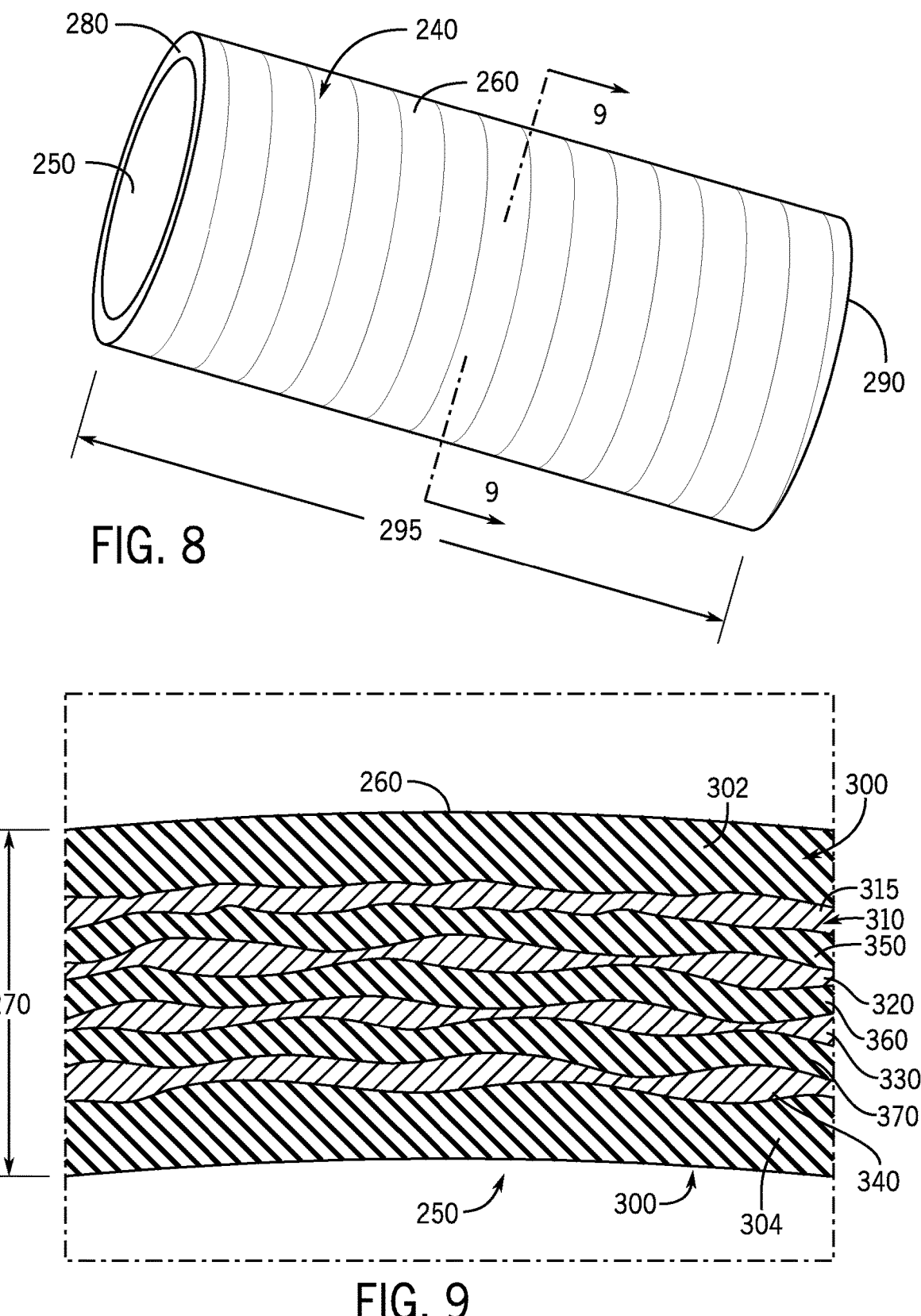
FIG. 8 is a perspective view of a thermally resistant exhaust coupler according to the present application
FIG. 9 is a partial cross section taken along line 9-9' of FIG. 8 and demonstrating the construction of a thickness of a thermally resistant exhaust coupler according to the present application.

In the embodiment shown in FIG. 9, the thickness 270 includes four thermally resistant fiber layers, namely a first thermally resistant fiber layer 315, a second thermally resistant fiber layer 320, a third thermally resistant fiber layer 330, and a fourth thermally resistant fiber layer 340 located between the inner cylindrical surface layer 304 and outer cylindrical surface layer 302, and thus between the inner cylindrical surface 250 and the outer cylindrical surface 260. Each thermally resistant fiber layer may extend the length 295 of the thermally resistant exhaust coupler 240. In this embodiment, the thickness 270 further includes a first intermediate elastomeric polymer layer 350 extending between the first thermally resistant fiber layer 315 and the second thermally resistant fiber layer 320 along the length 295, a second intermediate elastomeric polymer layer 360 extending between the second thermally resistant fiber layer 320 and the third thermally resistant fiber layer 330 along the length 295, and a third intermediate elastomeric polymer layer 370 extending between the third thermally resistant fiber layer 330 and the fourth thermally resistant fiber layer 340 along the length 295 of the thermally resistant exhaust coupler 240.

Each thermally resistant fabric layer 315, 320, 330, 340 has a lower thermal conductivity than the elastomeric polymer layer 302, 304, 350, 360, 370 such that at a steady state there is a substantial temperature drop from the inner cylindrical surface 250 of the coupler 240 that is in contact with the exhaust gases to the outer cylindrical surface 260 of the coupler 240 that is exposed to the atmosphere inside the engine cowling. In one embodiment the thermally resistant fabric 310 is a ceramic fiber. In certain embodiments, each thermally resistant fiber layer 315, 320, 330, 340 has lower thermal conductivity than the elastomeric polymer layer 302, 304, 350, 360, 370 when measured perpendicular to the exhaust flow direction such that the temperature of the outer cylindrical surface 260 is at least 140° C. less than the inner cylindrical surface 250. In other embodiments, the temperature of the outer cylindrical surface 260 is at least 150° C. less than the inner cylindrical surface 250. In still other embodiments the temperature of the outer cylindrical surface 260 is at least 200° C. less than the inner cyndrical surface 250. In certain embodiments, the thermally resistant fabric 310 is a ceramic fiber. The ceramic fiber layer may be constructed of one or more of the following materials: basalt, alumina, borica, silica, mullite, S glass or E glass, 3M® Nextel®, or a combination of the same. Alternatively, a Kevlar® containing fiber layer may be used. In certain embodiments, the thermally resistant fiber 310 is an open weave fiber. In other embodiments, thermally resistant fiber 310 is a closed weave fiber. In one embodiment, the thermally resistant fiber 310 is a basalt ceramic fiber. In certain embodiments the thermally resistant fabric layers 315, 320, 330, 340 do not extend the entire length 295 of the thermally resistant exhaust coupler 240, but extend substantially along the length 295. In other embodiments the thermally resistant fabric layers 315, 320, 330, 340 extend 90-99% of the length 295. In still other embodiments, the thermally resistant fabric layers 315, 320, 330, 340 extend less than 90% of the length 295. Likewise, in certain embodiments, the intermediate elastomeric polymer layers 350, 360, 370 do not extend the entire length 295 of the thermally resistant exhaust coupler 240, but extend substantially along the length 295; in other embodiments the intermediate elastomeric polymer layers 350, 360, 370 extend 90-99% of the length 295; and in still other embodiments, the intermediate elastomeric polymer layers 350, 360, 370 extend less than 90% of the length 295. The lengths of the thermally resistant fabric layers 315, 320, 330, 340 and the elastomeric polymer layers 350, 360, 370 do not need to be coextensive.

In addition to the thermal stability of the thermally resistant fabric 310, the thermal stability of the elastic polymer 300 is also important. When the thermally resistant coupler 240 is exposed to high temperatures, the elastic polymer 300 will degrade in a safe manner. Specifically, when exhaust gas is significantly above the degradation temperature of the polymer (e.g. if water fails to cool the exhaust gas), the elastic polymer 300 degrades into an insulating char retained within a thermally resistant fabric layer 315, 320, 330, 340. In one embodiment, the elastomeric polymer 300 has a decomposition temperature such that the elastomeric polymer 300 retains greater than 50% of its mass when heated above its decomposition temperature in an exhaust environment. The elastomeric polymer 300 may be constructed of one or more of the following materials: silicone rubber, nitrile butadiene rubber, high nitrile butadiene rubber, styrene butadiene rubber, ethylene propylene diene monomer rubber, epichlorohydrin and fluorinated hydrocarbon, or a combination thereof.

Example 1

A prior art silicone flexible coupler 140 was subjected to a test to measure the difference between the internal surface 150 temperature and the external surface 160 temperature. The prior art silicone flexible coupler 140 was constructed of solid silicone rubber having an outside diameter of 92 mm, a length of 152 mm and a thickness of 5.9 mm. The temperature of the exhaust running through the internal surface 150 was measured at 480° C. The ambient temperature was measured at 75° C. The temperature at the outer surface 160 during operation was measured at 342° C., indicating a 138° C. temperature drop.

Example 2

A thermally resistant exhaust coupler 240 having four thermally resistant fiber layers 315, 320, 330, and 340, an outer elastomeric polymer layer 302, an inner elastomeric polymer layer 304, intermediate elastomeric polymer layers 350, 360, 370, inner cylindrical surface 250 and outer cylindrical surface 260 was tested. The elastomeric polymer layers 302, 304, 350, 360, and 370 were constructed of silicone rubber. The thermally resistant fiber layers 315, 320, 330, and 340 were constructed of open weave Kevlar® fiber. The thermally resistant exhaust coupler 240 had an outside diameter of 92 mm, a length of 152 mm and a thickness of 5.9 mm. The temperature of the exhaust running through the inner cylindrical surface 250 was measured at 480° C. The ambient temperature was measured at 75° C. The temperature at the outer cylindrical surface 260 during operation was measured at 336° C., indicating a 144° C. temperature drop.

Example 3

A thermally resistant exhaust coupler 240 having four thermally resistant fiber layers 315, 320, 330, and 340, an outer elastomeric polymer layer 302, an inner elastomeric polymer layer 304, intermediate elastomeric polymer layers 350, 360, 370, inner cylindrical surface 250 and outer cylindrical surface 260 was tested. The elastomeric polymer layers 302, 304, 350, 360, and 370 were constructed of silicone rubber. The thermally resistant fiber layers 315, 320, 330, and 340 were constructed of closed weave Kevlar® fiber. The thermally resistant exhaust coupler 240 had an outside diameter of 92 mm, a length of 152 mm and a thickness of 5.9 mm. The temperature of the exhaust running through the inner cylindrical surface 250 was measured at 480° C. The ambient temperature was measured at 75° C. The temperature at the outer cylindrical surface 260 during operation was measured at 255° C., indicating a 225° C. temperature drop. It must be noted however, that the Kevlar® fiber has melting point between 427° C. and 482° C., giving it a less desirable thermal stability for this application.

Example 4

A thermally resistant exhaust coupler 240 having four thermally resistant fiber layers 315, 320, 330, and 340, an outer elastomeric polymer layer 302, an inner elastomeric polymer layer 304, intermediate elastomeric polymer layers 350, 360, 370, inner cylindrical surface 250 and outer cylindrical surface 260 was tested. The elastomeric polymer layers 302, 304, 350, 360, and 370 were constructed of silicone rubber. The thermally resistant fiber layers 315, 320, 330, and 340 were constructed of closed weave basalt ceramic fiber. The thermally resistant exhaust coupler 240 had an outside diameter of 92 mm, a length of 152 mm and a thickness of 5.9 mm. The temperature of the exhaust running through the inner cylindrical surface 250 was measured at 480° C. The ambient temperature was measured at 75° C. The temperature at the outer cylindrical surface 260 during operation was measured at 262° C., indicating a 218° C. temperature drop. The basal ceramic fiber has melting point of 1,280° C., giving it a desirable thermal stability for this application. E Glass with a melting point of 1,120° C. and 3M® Nextel® with a melting point of 1,800° C. to 2,000° C. are also favorable substitutes.

What is claimed is:

1. In combination, an engine having an exhaust manifold, an exhaust conduit located downstream of the exhaust manifold, and a thermally resistant exhaust coupler connecting the exhaust manifold to the exhaust conduit; wherein a spaced gap is located between the exhaust manifold to the exhaust conduit and exhaust gas moves through the gap from the exhaust manifold to the exhaust conduit through the gap and the thermally resistant exhaust coupler when the engine is running; wherein the thermally resistant exhaust coupler comprises an inner cylindrical surface and an outer cylindrical surface having a first distance therebetween, the first distance defining thickness, the thermally resistant exhaust coupler further comprising a top surface and a bottom surface having a second distance therebetween, the second distance defining a length of the thermally resistant exhaust coupler, wherein the inner cylindrical surface and outer cylindrical surface are constructed of an elastomeric polymer that extends 90% to 100% of the length of the thermally resistant exhaust coupler as at least one elastomeric polymer layer, and the thickness includes at least one thermally resistant fiber layer located between the inner cylindrical surface and outer cylindrical surface and extending the length of the thermally resistant exhaust coupler, wherein the thermally resistant exhaust coupler couples the exhaust manifold to the exhaust conduit; wherein the inner cylindrical surface is directly exposed to the exhaust gas and wherein the elastic polymer of the inner cylindrical surface decomposes into an insulating char retained within an adjacent thermally resistant fabric layer of the at least one thermally resistant fiber layers.

2. The combination of claim 1, wherein the elastomeric polymer comprises one or more of the following materials: silicone rubber, nitrile butadiene rubber, high nitrile butadiene rubber, styrene butadiene rubber, ethylene propylene diene monomer rubber, epichlorohydrin and fluorinated hydrocarbon, or a combination thereof.

3. The combination of claim 1, wherein the thermally resistant fiber layer is constructed from a ceramic fiber.

4. The combination of claim 3, wherein the ceramic fiber comprises one or more of the following materials: basalt, alumina, borica, silica, mullite, S glass or E glass, or a combination thereof.

5. The combination of claim 1, wherein the thermally resistant fiber layer is an open weave fiber layer.

6. The combination of claim 1, wherein the thermally resistant fiber layer is a closed weave fiber layer.

7. The combination of claim 1, wherein the elastomeric polymer is silicone rubber and the thermally resistant fiber layer is a closed weave ceramic fiber.

8. The combination of claim 7, wherein the closed weave ceramic fiber comprises one or more of the following materials: basalt, alumina, borica, silica, mullite, S glass or E glass, or a combination thereof.

9. The combination of claim 7, wherein the closed weave ceramic fiber is a basalt ceramic fiber.

10. The combination of claim 7, wherein a temperature of the outer cylindrical surface is at least 200° C. less than a temperature of the inner cylindrical surface when the temperature of the exhaust running through the internal surface is at least 480° C.

11. The combination of claim 1, wherein the elastomeric polymer of the inner cylindrical surface decomposes from the exhaust moving through the thermally resistant exhaust coupler.

12. The combination of claim 11, wherein the exhaust is at least 480° C.

13. The combination of claim 1, wherein the thermally resistant fiber layer has lower thermal conductivity than the elastomeric polymer when measured perpendicular to an exhaust flow direction such that a temperature of the outer cylindrical surface is at least 140° C. less than a temperature of the inner cylindrical surface when the temperature of the exhaust running through the internal surface is at least 480° C.

14. The combination of claim 1, wherein the thickness includes at least two thermally resistant fiber layers located between the inner cylindrical surface and outer cylindrical surface and extending 90% to 100% of the length of the thermally resistant exhaust coupler, and the thickness further includes an elastomeric polymer layer extending between the at least two thermally resistant fiber layers extending along 90% to 100% of the length of the thermally resistant exhaust coupler.

15. The combination of claim 1, wherein the thickness includes three thermally resistant fiber layers located between the inner cylindrical surface and outer cylindrical surface and extending 90% to 100% of the length of the thermally resistant exhaust coupler and defining a first thermally resistant fiber layer, a second thermally resistant fiber layer, and a third thermally resistant fiber layer; and wherein the thickness further includes a first intermediate elastomeric polymer layer extending between the first thermally resistant fiber layer and the second thermally resistant fiber layer along at least a portion of the length of the thermally resistant exhaust coupler, and a second intermediate elastomeric polymer layer extending between the second thermally resistant fiber layer and the third thermally resistant fiber layer extending along at least a portion of the length of the thermally resistant exhaust coupler.

16. The combination of claim 15, wherein at least one of the three thermally resistant fiber layers extend 90-99% of the length of the thermally resistant exhaust coupler, and wherein at least one of the first or second intermediate elastomeric polymer layers extend 90-99% of the length of the thermally resistant exhaust coupler.

17. The combination of claim 16, wherein at least one of the first or second intermediate elastomeric polymer layers extend up to 90% of the length of the thermally resistant exhaust coupler.

18. The combination of claim 1, wherein the thickness includes four thermally resistant fiber layers located between the inner cylindrical surface and outer cylindrical surface and extending 90% to 100% of the length of the thermally resistant exhaust coupler and defining a first thermally resistant fiber layer, a second thermally resistant fiber layer, a third thermally resistant fiber layer, and a fourth thermally resistant fiber layer; and wherein the thickness further includes a first intermediate elastomeric polymer layer extending between the first thermally resistant fiber layer and the second thermally resistant fiber layer extending along at least a portion of the length of the thermally resistant exhaust coupler, and a second intermediate elastomeric polymer layer extending between the second thermally resistant fiber layer and the third thermally resistant fiber layer along at least a portion of the length of the thermally resistant exhaust coupler, and a third intermediate elastomeric polymer layer extending between the third thermally resistant fiber layer and the fourth thermally resistant fiber layer along at least a portion of the length of the thermally resistant exhaust coupler.

19. The combination of claim 18, wherein the inner cylindrical surface, the outer cylindrical surface, the first intermediate elastomeric polymer layer, the second intermediate elastomeric polymer layer, and the third intermediate elastomeric polymer layer comprise one or more of the following elastomeric polymers: silicone rubber, nitrile butadiene rubber, styrene butadiene rubber, ethylene propylene diene monomer rubber, epichlorohydrin and fluorinated hydrocarbon, or a combination thereof.

20. The combination of claim 18, wherein the first thermally resistant fiber layer, the second thermally resistant fiber layer, the third thermally resistant fiber layer, and the fourth thermally resistant fiber layer are constructed from a fiber comprising one or more of the following materials: basalt, alumina, borica, silica, mullite, S glass or E glass, Poly-paraphenylene terephthalamide, or a combination thereof.

21. The combination of claim 20, wherein the first thermally resistant fiber layer, the second thermally resistant fiber layer, the third thermally resistant fiber layer, and the fourth thermally resistant fiber layer are closed weave ceramic fiber layers.

22. The combination of claim 18, wherein the inner cylindrical surface, the outer cylindrical surface, the first intermediate elastomeric polymer layer, the second intermediate elastomeric polymer layer, and the third intermediate elastomeric polymer layer comprise silicone rubber and the first thermally resistant fiber layer, the second thermally resistant fiber layer, the third thermally resistant fiber layer, and the fourth thermally resistant fiber layer are constructed from a closed weave basalt ceramic fiber.

23. The combination of claim 18, wherein at least one of the four thermally resistant fiber layers extend 90-99% of the length of the thermally resistant exhaust coupler, and wherein the at least one of the first, second and third intermediate elastomeric polymer layers extend 90-99% of the length of the thermally resistant exhaust coupler.

24. The combination of claim 23, wherein at least one of the first, second and third intermediate elastomeric polymer layers extend up to 90% of the length of the thermally resistant exhaust coupler.

25. The combination of claim 1, wherein the at least one thermally resistant fiber layer located between the inner cylindrical surface and outer cylindrical surface extends 90-99% of the length of the thermally resistant exhaust coupler.

* * * * *